(12) United States Patent
Antonuzzo

(10) Patent No.: US 10,477,048 B2
(45) Date of Patent: Nov. 12, 2019

(54) PRODUCTION INSTALLATION AND METHOD FOR BLOCK BOOKS IN PARALLEL FROM DIGITAL PRINT

(71) Applicant: S.E.M. Servizi Editoriali Milano S.P.A., Milan (IT)

(72) Inventor: Giovanni Antonuzzo, Milan (IT)

(73) Assignee: S.E.M. Servizi Editoriali Milano S.P.A., Milan (IT)

(*) Notice: Subject to any disclaimer, the term of this patent is extended or adjusted under 35 U.S.C. 154(b) by 0 days.

(21) Appl. No.: 16/020,066

(22) Filed: Jun. 27, 2018

(65) Prior Publication Data
US 2018/0376019 A1 Dec. 27, 2018

(30) Foreign Application Priority Data
Jun. 27, 2017 (IT) .......................... 102017000071962

(51) Int. Cl.
| | |
|---|---|
| *H04N 1/00* | (2006.01) |
| *B41J 3/28* | (2006.01) |
| *B41J 3/62* | (2006.01) |
| *G06F 3/12* | (2006.01) |
| *B42C 19/06* | (2006.01) |

(52) U.S. Cl.
CPC ............ *H04N 1/00631* (2013.01); *B41J 3/28* (2013.01); *B41J 3/62* (2013.01); *B42C 19/06* (2013.01); *G06F 3/124* (2013.01); *H04N 1/00676* (2013.01)

(58) Field of Classification Search
CPC ............ H04N 1/00631; H04N 1/00676; B42C 19/06; B41J 3/28; B41J 3/62; G06F 3/124
See application file for complete search history.

(56) References Cited

U.S. PATENT DOCUMENTS

| | | | | |
|---|---|---|---|---|
| 3,730,512 A | 5/1973 | Bellanca | | |
| 2006/0288891 A1* | 12/2006 | Hunkeler | ................ | B41F 13/56 |
| | | | | 101/227 |
| 2010/0187745 A1* | 7/2010 | Herpell | .................... | B41J 2/155 |
| | | | | 270/52.17 |

(Continued)

FOREIGN PATENT DOCUMENTS

| | | |
|---|---|---|
| DE | 485000 C | 10/1929 |
| DE | 102012103808 A1 | 11/2013 |

(Continued)

*Primary Examiner* — Neil R McLean
(74) *Attorney, Agent, or Firm* — Banner & Witcoff, Ltd.

(57) ABSTRACT

A production installation (21) produces book blocks (22) in parallel from digital prints on basic sheets (24). Each book block has "n" book sheets aligned through rows (46) and columns (44) and each basic sheet has "m" book sheets (43) equal to the number "m" of book blocks to be produced. Under the control of an electronic unit (56), a point bonding group (51) dispenses adhesive strokes (61) on the basic sheets across the rows and/or the columns, a stacking group (52) stacks the basic sheets and forms a basic block (62) stabilized by the point bonds, while a separation group (53) cuts and separates the book blocks from the basic block along the rows and the columns for following treatments. The basic sheets have machine-readable basic codes (68) and the electronic control unit actuates the point bonding group, the stacking group and the separation group on the basis of information derived from the basic codes.

15 Claims, 9 Drawing Sheets

(56) References Cited

U.S. PATENT DOCUMENTS

2012/0251270 A1* 10/2012 Speller ................. B42C 9/0006
　　　　　　　　　　　　　　　　　　　　　　412/8
2014/0375044 A1* 12/2014 De Marco ............... B42C 19/06
　　　　　　　　　　　　　　　　　　　　　　281/15.1

FOREIGN PATENT DOCUMENTS

| EP | 0553870 A1 | 8/1993 |
| EP | 2199084 A1 | 6/2010 |
| EP | 2314533 A1 | 4/2011 |
| GB | 1403623 A | 8/1975 |
| WO | 2010139062 A1 | 12/2010 |

* cited by examiner

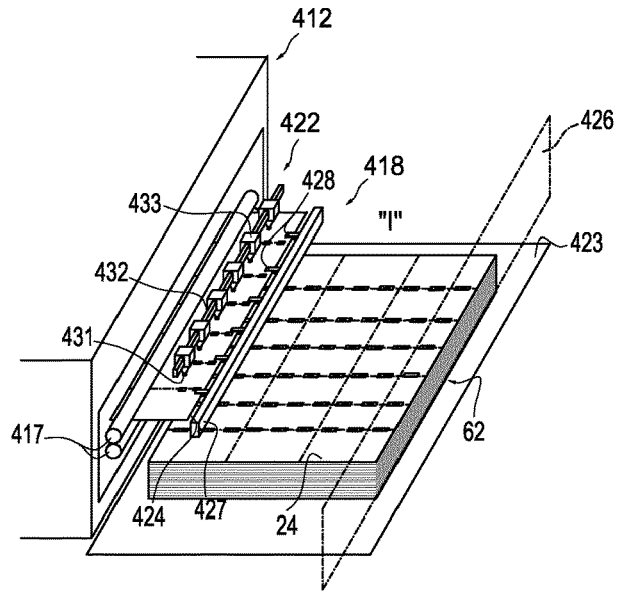
*Fig. 10a*
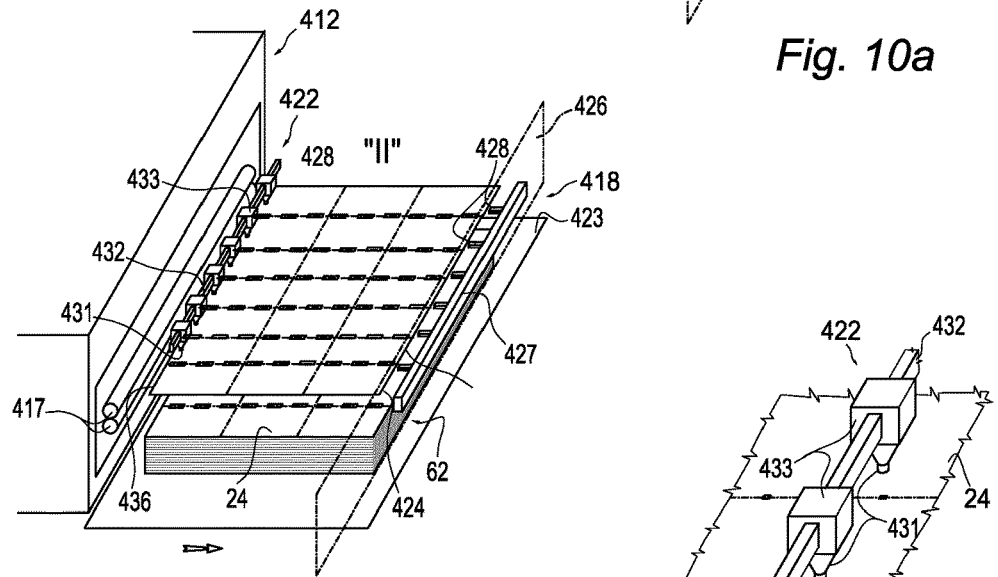
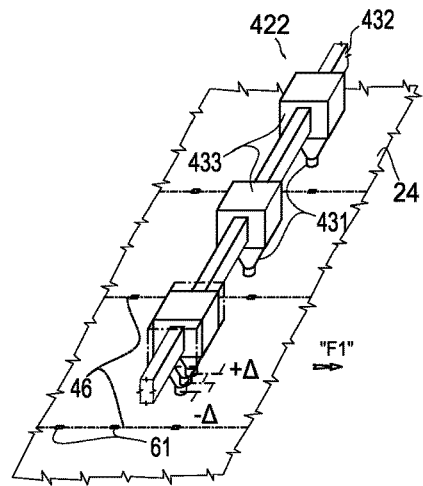
*Fig. 10b*
*Fig. 12*
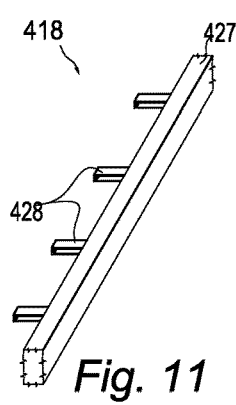
*Fig. 11*

PRODUCTION INSTALLATION AND METHOD FOR BLOCK BOOKS IN PARALLEL FROM DIGITAL PRINT

RELATED APPLICATION

This application claims priority to Italian Application No. UA2017A004635 (N. 102017000071962) filed on Jun. 27, 2017 and entitled "Production installation and method for block books in parallel", the content of which is incorporated herein by reference in its entirety

FIELD OF THE INVENTION

The present invention relates to an installation and a method for the production of block books in parallel.

More specifically the invention relates to an installation and a method of production in parallel for book blocks in parallel from digital prints on basic sheets, wherein each book block has a given number "n" of book sheets and each basic sheet has a number "m" of book sheets equal to the number "m" of the book blocks to be produced and wherein said installation comprises a stacking group for the basic sheets, a separation group for the book blocks, and an electronic control unit for the stacking group and the separation group. The book sheets are distributed on the basic sheets by aligning through aligning rows and aligning columns and separation areas adjacent to the book sheets; and the stacking group is actuatable for stacking the basic sheets and forming a basic block.

BACKGROUND OF THE INVENTION

A production installation for block books in parallel has been described in which the block books are digitally printed on basic sheets arranged in sequence along a previously printed strip unwinding from a spool. Each block book has a given number of book sheets, and each basic sheet has a number of book sheets that is identical to the amount of block books to be produced. The basic sheets are constituted by sections of the strip of book sheets arranged in a single row. The printed strip therefore shows a number of columns (four in the disclosed example) equal to the number of block books and a number of sections equal to the number of book sheets of the block books. The installation cuts the strip transversely by separating the various sections, stacks the sections with the basic sheets side by side and, after longitudinal cuts for separating the columns, bonds an edge the block books and proceeds to a serial arrangement for following manufacturing operations.

The installation of the prior art has limitations on the number of block books which can be manufactured in parallel, depending on the width of the strip and problems of reliability in dependence of the low stability of the stacked sheets to the stresses associated to the cuts and the separations.

SUMMARY OF THE INVENTION

An object of the invention is to provide an installation and a method of parallel production of book blocks from digital printing with high reliability, high operating speed and low operating costs for medium/high amount of books of a same edition.

In accordance with this object, the book blocks and the basic sheets are in association with data derived from machine-readable basic codes, while the production installation further comprises a bonding station including a point bonding group for the basic sheets and code detectors for the reading of the basic codes. The point bonding group is provided for dispensing adhesive strokes on the basic sheets across the aligning rows and/or the aligning columns, in correspondence of the separation areas, while the stacking group stacks the basic sheets, without sliding, forming said basic block in which the book sheets are aligned and stabilized by the adhesive strokes. The separation group is provided for cutting the book blocks from the basic block along the aligning rows and the aligning columns of the book sheets and separating said book blocks for following treatments; and the electronic control unit responds to signals from said code detectors for actuating the point bonding group, the stacking group and the separation group on the basis of information from said basic codes.

Another object of the invention is to provide a method for the production in parallel for book blocks by digital printing having high reliability, a high operating speed and low operating costs for medium/high amount of books of a same edition.

The production method for book blocks by digital printing achieves, in parallel, a given number "m" of block books and employs a number of basic sheets equal to the number of sheets of each block books and wherein each basic sheet aligns a number "m" of book sheets equal to the number "m" of the book blocks. The method is controlled by an electronic control unit in response to data associated to the book blocks and the basic sheets derived from machine-readable basic codes and provides the following steps:

a) dispensing adhesive strokes on the basic sheets at the separation areas of the book sheets on said book blocks whereby forming pre-bonded basic sheets;

b) stacking the pre-bonded basic sheets as preparation for a basic block wherein the book sheets of the respective book blocks are aligned and pre-bonded in correspondence of an edge;

c) separating the book blocks from the basic block by means of cuts along the aligning rows and the aligning columns of the book blocks; and d) arranging in sequence the separated book blocks for following treatments.

The installation and the method of production for block books in parallel of the present invention are intended, mainly but not exhaustively, to an automatic system for manufacturing books on demand.

BRIEF DESCRIPTION OF THE DRAWINGS

The characteristics of the invention will become clear from the following description, given purely by way of non-limiting example, with reference to the appended drawings in which:

FIGS. 10A and 10b show some components of the installation of FIG. 9 in different operating steps;

FIG. 11 represents, in enlarged scale, some components of FIG. 9; and

FIG. 12 shows, in enlarged scale, other components of FIG. 9.

DETAILED DESCRIPTION OF THE PREFERRED EMBODIMENTS

Figure 1:
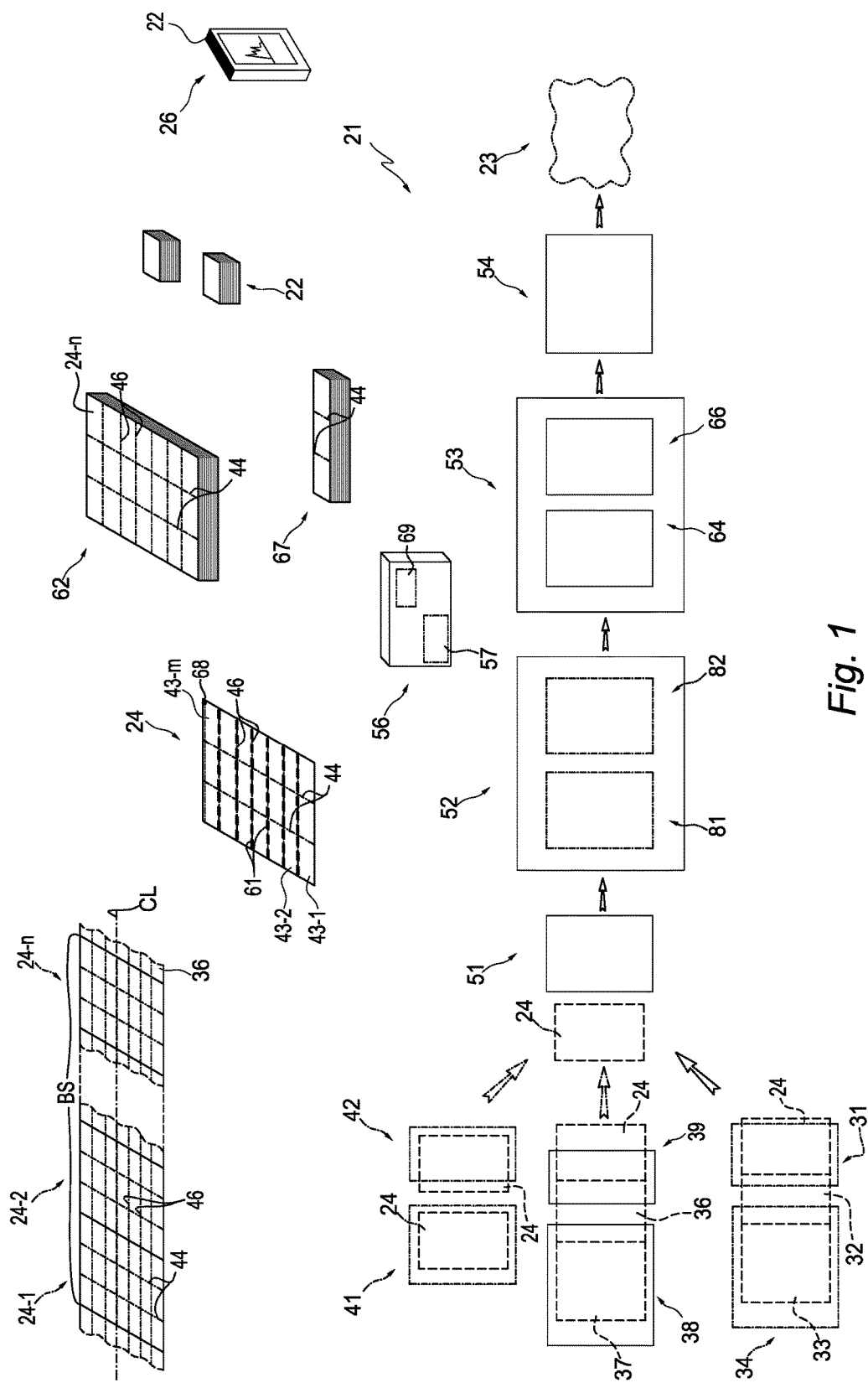
FIG. 1 is a diagram of an installation for production of block books in parallel in accordance with the invention.
Figure 2:
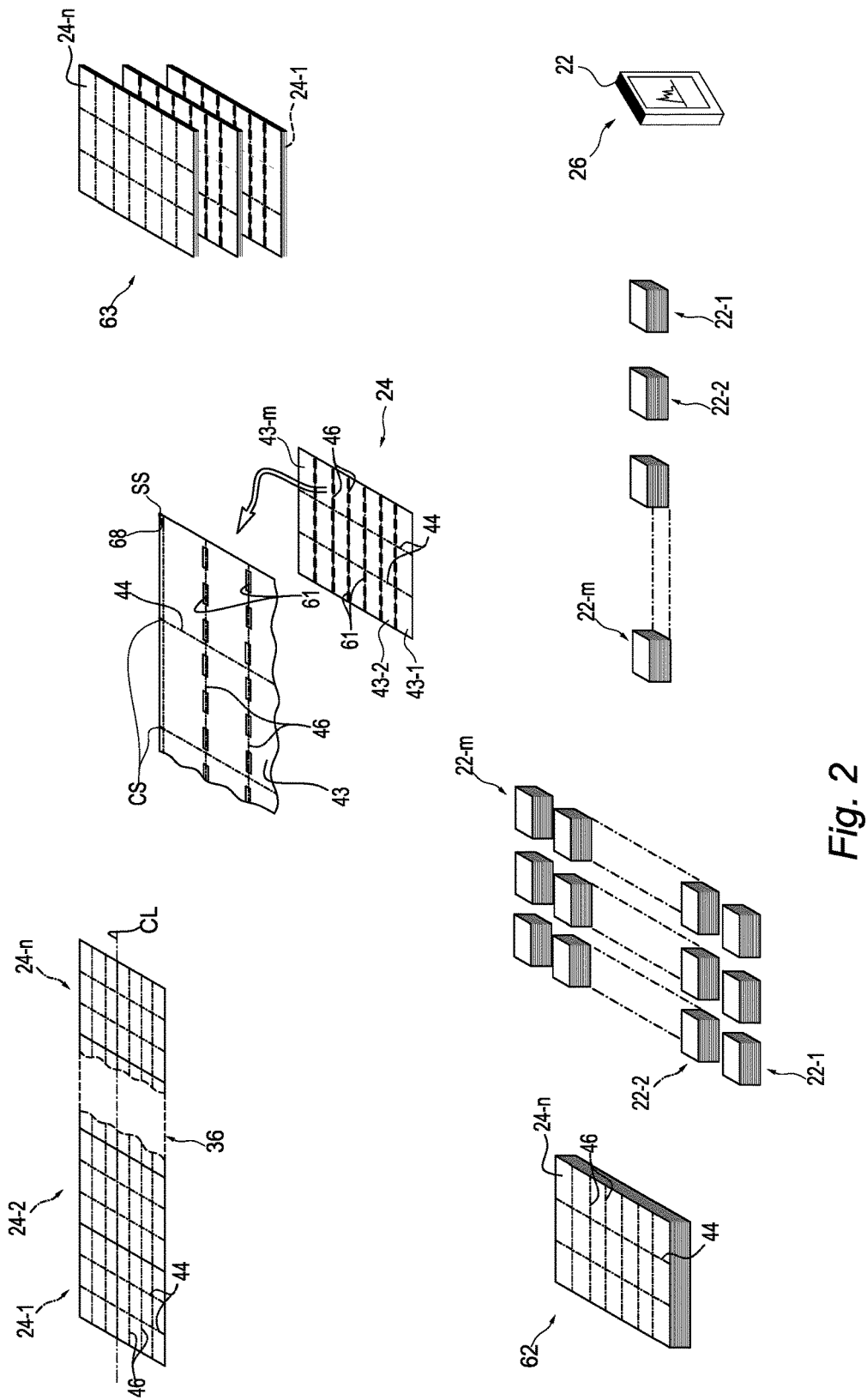
FIG. 2 shows components used and achieved by the installation of the invention.

With reference to FIGS. 1 and 2, the numeral 21 represents a production installation in parallel for block books 22 according to the invention, for example directed to a system for manufacturing books by digital printing 23 on basic sheets 24 for books on demand 26.

The production installation 21 can operate on line downstream of a digital printer 31 with the pages of the book blocks 22 printed on single sheets or printed, in sequence, on a continuous strip 32 wound on a reel 33. An unwinding device 34 unwinds the strip from the roll 33 and a cutting device integrated in the printer 31 separates the basic sheets 24 from the strip 32.

In the following description, the installation 21 operates, off-line, on the pages of the book blocks 22 previously printed by a digital printer on the two faces of a continuous strip 36. The strip 36 is wound on a reel 37, an unwinding device 38 unwinds the strip 36 and a cutting device 39 transversely cuts the strip 36 by separating the basic sheets 24 of origin for the block books 22. Alternatively, the basic sheets 24 can be taken from a stack of a magazine 41, from which the basic sheets 24 are introduced into the installation 21 by means of a sheet separator and sheet feeder 42.

In accordance with the invention the production installation is provided for producing a number "m" of block books 22-1, 22-2, . . . , 22-$m$ in parallel. For a block books of "n" sheets, the installation 21 uses an equal number "n" of basic sheets 24-1, 24-2, . . . 24-$n$, in which each basic sheet 24 has, in alignment, a number "m" of sheet books 43-1, 43-2, . . . , 43-$m$ equal to the number "m" of block books to be produced.

The basic sheets 24-1, 24-2, . . . 24-$n$ for the "m" block books 22-1, 22-2, . . . , 22-$m$ are arranged in sequence along the strip 36 in a section "BS" associated to the "m" respective books 26 to be produced. In each basic sheet 24, the book sheets 43 are distributed according to a grid with columns and rows defined by geometrical lines 44 and 46 and separation areas between the sheets. The columns and the rows are, respectively, perpendicular and parallel to a longitudinal axis "CL", of the strip 36. Each sheet book 43-1, 43-2, . . . , 43-$m$ is thus delimited by the column lines 44 for the conventionally upper and lower edges of the block book lines and by the row lines 46 (or by the edges of the strip 36) for the lateral margins.

In a non limitative embodiment, the production installation of the invention employs basic sheets having a width of 52 cm (20" ½) and a length of 80 cm with four column lines and four row lines for 16 book sheets of 12×20 cm.

Structurally, the installation 21 comprises a bonding station with a point bonding group 51, a stacking group 52 for the basic sheets 24-1, 24-2, . . . 24-$n$, a separation group 53 for the block books 22-1, 22-2, . . . 22-$m$ and a serializing mechanism 54 for serializing the separated block books 22.

An electronic control unit 56 controls the groups 51, 52, 53, and the mechanism 54 on the basis of a general program 57, specific data of the block books 22 to be produced and process information corning from sensors, not shown, associated with the various functional components of the installation 21.

The point bonding group 51 is designated for dispensing adhesive strokes 61 on the basic sheets 24, in a symmetrical manner, on the separation areas between the sheets book 43 crossing the row lines 46.

The stacking group 52 is actuatable for stacking the basic sheets 24-1, 24-2, . . . , 24-$n$ pre-bonded by the group 51, forming a basic block 62 in which the basic sheets 24 are point bonded each other in separation areas covered by the adhesive strokes 61. The so formed basic block 62 constitutes a stabilized set, which can be moved and cut without risk of misalignment of the sheets 24.

The separation group 53 has the function of cutting the basic block 62 along the column lines 44 and the row lines 46, whereby individually separating the block books 22-1, 22-2, . . . , 22-$m$ previously stabilized by the effected point bonding.

For example, the separation group 53 comprises a line cutter 64 and a column cutter 66. The line cutter 64 can be actuated on command of the electronic unit 56 and the program 57 in order to cut the basic block 62 along the row lines 46 to separate "block slices" 67 with more block books 22. The column cutter 66 can be constituted by a milling device and is operable for separating the "block slices" 67 with more book blocks 22 along the column lines 44.

The book blocks 22 are also point bonded at least on one edge and continue to constitute a stabilized set for movement and processing without the risk of misalignment of the basic sheets 24.

The serializing mechanism 54 has the function of arranging in sequence the "m" book blocks separated 22-1, 22-2, . . . , 22-$m$. as required by the system for manufacturing books 23 for following processing.

The data of the book blocks 22 comprise machine-readable basic codes, while the production installation 21 comprises detectors, not shown, for the reading of the basic codes and position sensors. The basic codes are associated with the basic sheets 24 for the point bonding information and the separation information and the electronic control unit responds to the bonding information and the separation information and to signals from the position sensors for actuating the stacking group 52 and the separation assembly 53.

By way of example, the basic codes are of optical types consisting of bar codes or matrix codes (datamatrix) 68 (FIGS. 1 and 2) printed on a service margin of the basic sheets 24, which will be trimmed after the separation of the book blocks. The information of the bar code or matrix codes 68 is used to address corresponding locations of a memory 69 to provide the electronic control unit 56 with the specific data for the actuation of the point bonding group 51, the stacking group 52 and the separation group 53.

On the service margin of each basic sheet 24 are also printed positioning strokes "CS" associated with the columns rows 44 and a positioning stroke "SS" associated with the leading edge of the sheet 24. The strokes "SS" and the stroke "CS" are detected by the position sensors for a correct positioning of the basic sheets with respect to the operating components of the production installation of the invention.

The electronic unit 56 controls the point bonding group 51 in such a way as to distribute the adhesive on a face of the sheets 24 to be stacked or on a face of the basic sheets in stacking and provided to be superimposed by a following sheet 24. The condition of sheet to be not pre-bonded can be imposed by inserting this feature in the basic code of the same basic sheet 24.

In the case of stacking from above and for a basic block 62 by "n" sheets, the upper face of the sheet 24-(n−1) is therefore pre-bonded with the adhesive strokes 61, while, for the sheet 24-n, the upper face is left without adhesive and its lower face is provided for the point-bonding by the sheet 24-(n−1).

The structure of the stacking group 52 is also such as to ensure that the basic sheets 24-2, . . . , 24-n in stacking overlap without sliding on the sheets below, for a point-bonding of the various sheets of the block 62 free of burr and in which the edges of the basic sheets are aligned in vertical.

Figures 3, 4:
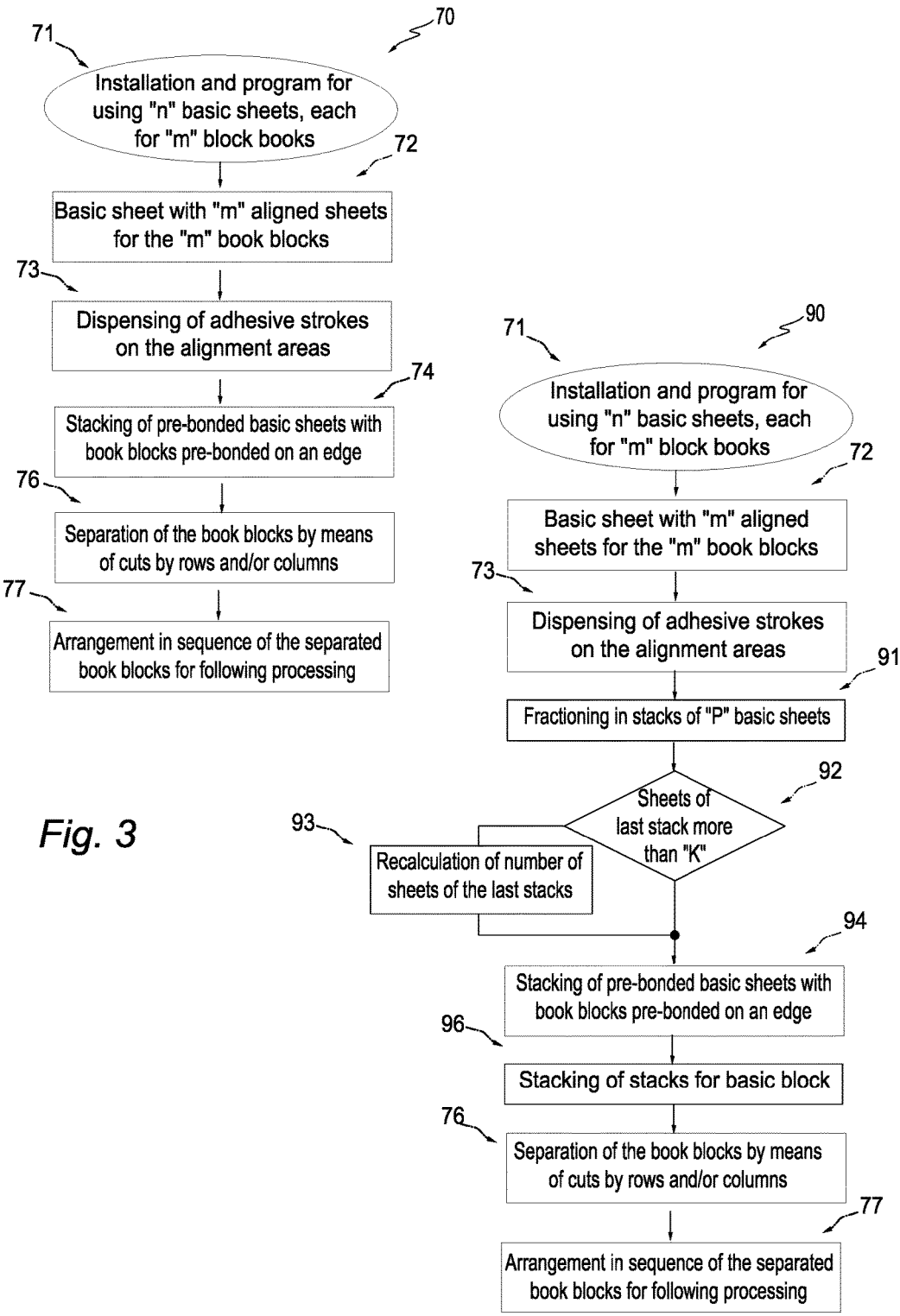
FIG. 3 represents a block diagram of the method of production for block books of the invention.
FIG. 4 is a block diagram of a variant of the method of FIG. 3.

From the above description, with reference to the flow chart shown in FIG. 3, the method involving the production of book blocks of the invention, designated by the reference numeral 70 operates with digital printing on basic sheets and wherein each book block has a given number "n" of sheets to be assembled.

The method 70 requires, condition 71, the use of a production installation that employs "n" basic sheets, each with "m" book blocks to produce in parallel "m" book blocks directed to the production of as many books. Moreover, condition 72, it is required that each basic sheet 24 has in alignment a number "m" of sheet books equal to the number "m" of the book blocks to be produced.

The method for the production of book blocks 70 comprises in particular the following steps controlled by the program 57:
a) distributing adhesive strokes on the basic sheets in correspondence of the separation areas of the book sheets forming pre-bonded basic sheets, step 73;
b) stacking without slipping and with point-bonding the pre-bonded basic sheets of preparation for a basic block, with the sheets of the book blocks aligned and pre-bonded on one edge, step 74;
c) separating the book blocks from the basic block by means of cuts along the rows and/or columns of alignment of the book blocks, step 76; and
d) arranging in sequence the book blocks stabilized and separated from the basic blocks, for following processing, step 77.

Conveniently, the stacking group 52 (FIG. 1) can operate in a fractional way, by forming sheet stacks 63 (see FIG. 2) stabilized with a predetermined number of basic sheets 24 stacked and point bonded and by overlapping with point-bonding the stacks on a basic block 62 being formed up to reach the number "n" of the provided sheets. It is performed on the basis of the program 57.

In particular, the stacking group 52 comprises a sheet overlapping device 81 and a stack overlapping device 82. The sheet overlapping device 81 can be actuated on command of the electronic unit 56 and the program 57 for stacking without sliding and point-bonding the basic sheets 24 on the underlying sheets, forming the stacks 63. The stack overlapping device 82 can be actuated for stacking the sheet stacks 63 without sliding and point-bonding the sheet stacks 63 on the underlying the sheet stacks, forming the basic block 62.

The fraction in stacks is provided for facilitating the formation of the basic blocks 62 and the transport of the basic sheets 24.

The number of basic sheets of the stacks "P" is chosen for an optimization of the fractional solution. In the case in which the number of sheets of the last fractional sheet stack 63 is lower than a predetermined number "K", the program 57 recalculates the fractioning of the last two stacks so as to avoid the formation of sheet stacks with an excessively low number of basic sheets.

Figure 6:
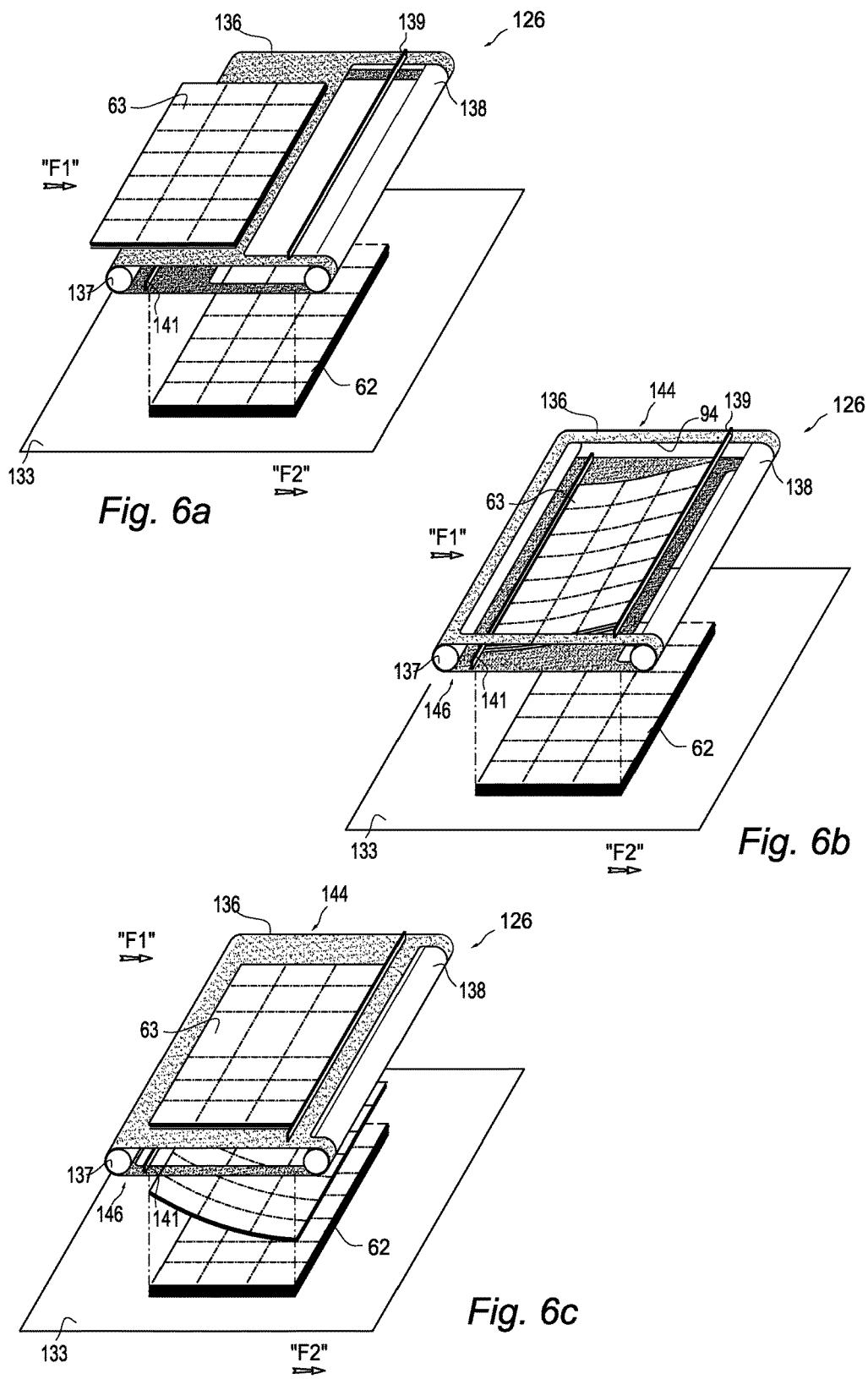
FIGS. 6A-6C show, in enlarged scale, some components of the installation of FIG. 5 in different operating steps.

For the production installation of the invention which operates with fractioning in stacks, the method for producing the book blocks, generally indicated by the reference number 90 in FIG. 6, provides the condition 71 (installation and program for "n" basic sheets, each for "m" book blocks) and the condition 72 (basic sheet 24 with number "m" of sheets equal to the number "m" of the book blocks) and the step 73 (adhesive strokes on the basic sheets in correspondence of the separation areas) of the method 70 but presents differences in the procedures of the stacking.

In summary, the method 90 provides, by the program 113, the fractioning of the number "n" of the provided sheets in fractions of "P" basic sheets and the calculation of the number of basic sheets of the last sheet stack 63, step 91. In a decision logic box 92, the program checks if the number of sheets of the last stack is greater than "K". In the negative case, the program recalculates the number of sheets of the last stacks, step 93, so that they are all greater than "K".

After the positive check or the recalculation, the method 90 proceeds with the stacking, without sliding, of the pre-bonded basic sheets 24 for preparing the sheet stacks 63, step 94, and stacking, without sliding, the stacks for preparing the basic block 62, step 96.

The method 90 then continues with the separation of the book blocks 22 and their serializing, with the same steps 76 and 77 of the method 70.

The functional groups and the mechanisms of production installation for book blocks above described can be implemented in different embodiments without departing from the ambit of the invention. Following are some non limiting examples of such implementations.

First Example of Embodiment of the Invention

Figure 5:
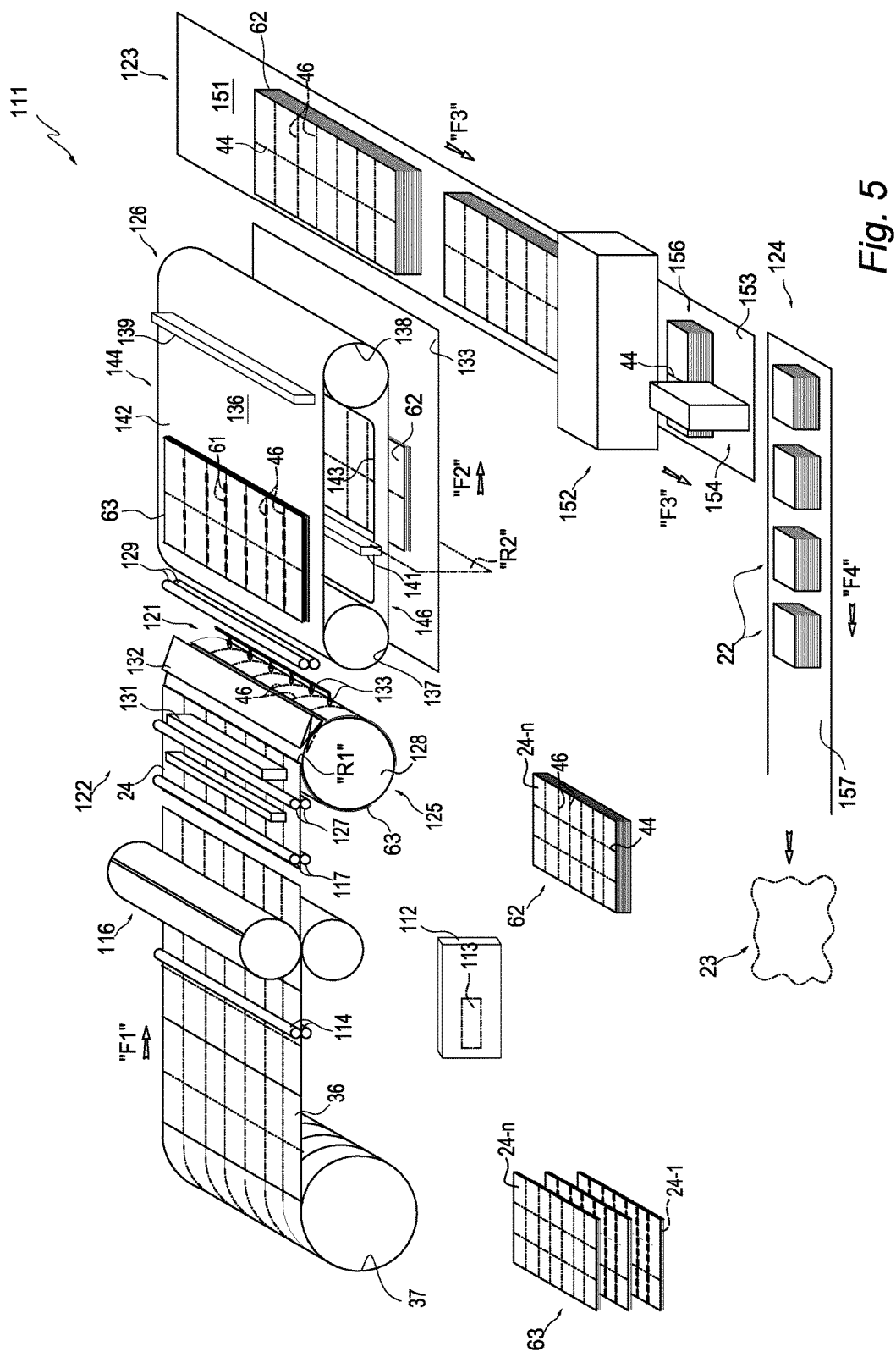
FIG. 5 is a schema of a production installation for block books in accordance with a first embodiment of the invention.

In a first example of embodiment of the invention of FIG. 5, the production installation for book blocks in parallel, represented with 111, operates off-line under the control of an electronic unit 112 and on the basis of a program 113. The pages for the book blocks 22, grouped among the sheets basic 24, are digitally printed on the two faces of the continuous strip 36.

The strip 36 is unwound from a reel 37 and is fed in a direction "F1" by feeding rollers 114. The basic sheets 24 are transversely separated by a cutting device 116, for example of the rotary type, and extracted individually by rollers 117 along the direction "F1". The basic blocks 62 are formed in a fractional way, with the sheet stacks 63 of a predetermined number of basic sheets 24 stacked and superimposed up to reaching the number "n" of provided sheets.

The production installation 111 comprises in particular, correspondingly to the groups 51, 52, 53 and the mechanism 54 of the installation 21, a point bonding group 121 and a stacking group 122 for the basic sheets 24-1, 24-2, . . . 24-N, a separation group 123 for the book blocks 22-1, 22-2, . . . 22-m and a serializing mechanism 124 for serializing the separated book blocks 22.

The stacking group 122 includes a sheet overlapping device 125 with a function similar to that of the sheet overlapping device 81 of the group 51 and a stack overlapping device 126, with a function similar to that of the stack overlapping device 82, for the formation of the basic blocks 62 with the sheet stacks 63.

The sheet overlapping device 125 comprises feed rollers 127 for the basic sheets 24, a holding roller 128 for holding the sheets on the side surface the basic sheets 24 entering corresponding to a stack 63 and extraction rollers 129 for the stacks. The holding roller 128 is, for example, of electrostatic type and it is associated with an electrode 131 of charge for the incoming basic sheets 24 and a diverter 132 for the sheet stacks 63.

The point bonding group 121 comprises a series of nozzles or similar dosing elements 133 arranged near the roll 128. In greater detail, the nozzles or dosing elements 133 are aligned parallel to a generating line on the lateral surface of the roller 128 and are spaced apart so as to be in front of the row lines 46 of basic sheets 24 held by the roller 128.

In use and according to a known prior art, the basic sheets 24 extracted from the rollers 129 are electrostatically charged by means of the electrode 131 and wound in overlapping on the roller 128, in alignment starting from a reference angular position "R1". On the control of the electronic unit 112, the nozzles or dosing elements 133 provide to deposit the adhesive strokes 61 on the separation areas of the book sheets, symmetrically across the row lines 46.

Upon reaching the programmed number "P" of sheets 24 or of the correct number of sheets, the sheet stacks 63 are extracted from the roller 128 by means of the diverter 132 and of the extraction rollers 129, displaced on overlay device 126 parallel to the direction "F1" and deposited on a conveyor belt 133 with stacking and point-bonding on stacks claims, if present, for the formation of the basic block 62.

The stack overlapping device 126 is arranged above the conveyor belt 133 and comprises a closed ring band 136 for supporting and conveying the sheet stacks 63, two driving rollers 137 and 138 and two stop bars 139 and 141.

The closed ring band 136 defines a solid section 142 and a cutaway section 143. The ring 136 is extended longitudinally horizontally between the driving rollers 137 and 138 and has an upper branch 144 downstream of the extraction rolls 129 and a bottom branch 146 facing on the conveyor belt 133. The solid section 142 and the cutaway section 143 each have dimensions greater than the maximum dimensions of the basic sheets 24 which can be handled by the installation 111. It for performing a complete support for the basic sheets 24 by the solid section 142 and for a passage without obstacles of the sheets 24 through the cutaway section 143 between the rollers 137 and 138.

The stop bar 139 is arranged adjacent and above the outer surface of the upper branch 144 in proximity to the roller 138, while the stop bar 141 is arranged between the branches 144 and 146 adjacent to and above the inner surface of the lower branch 146 in proximity to the roller 137.

The separation group 123 comprises a feed conveyor belt 151 for the basic blocks 62, a transversal cutting device 152, an extraction conveyor belt 153 and a longitudinal cutting device 154.

The conveyor belt 151 is arranged downstream of the conveyor belt 133 extended transversely to the belt 133 and is moved in a direction "F3" perpendicular to the direction "F2" for feeding the cutting device 152. The transversal cutting device 152 and the longitudinal cutting device 154 are, for example of the type with a "guillotine" blade or a rotating blade and, respectively, of the type with circular saw.

The transversal cutting device 152 is actuated on control of the electronic unit 112 in order to cut the basic blocks 62 transversely to the direction "F3" along the row lines 46 so as to define "slice blocks" 156 with more book blocks 22. The longitudinal cutting device 154 receives the "slice blocks" 156 and can be actuated jointly to the movement of "slice blocks" 156 in the direction "F3" by means of the conveyor belt 153 for separating the book blocks 22 along the column lines 44 keeping them in a condition of flanking.

The serializing mechanism 124 comprises an output conveyor belt 157 extending transversely with respect to the extraction conveyor belt 153. The conveyor belt 157 is located downstream of the extraction conveyor belt 153 and is moved in a direction "F4" perpendicular to the direction "F3" and direction opposite to the direction "F2".

In operating conditions, the driving rollers 137 and 138 move the closed ring band 136 for a displacement of the upper branch 144 in the direction "F1", starting from the roller 137 and for a displacement of the lower branch 144 in a direction opposite to the direction "F1", starting from the roller 138.

The movement of the closed ring band 136 is synchronized with the extraction of sheet stacks 63 from the holding roller 128 so as to receive by the rollers 129 the stacks on the outer surface of the solid section 142 of the branch 144 and to draw up the stacks up to the bar 139. The sheet stacks 63 are arrested by the bar 139 (FIGS. 6a and 6b) while the band 136 continues to move by sliding below the stacks.

The passage of the cutaway section 143 causes the fall of the arrested sheet stacks 63 on the inner surface of the underlying branch 146, their pulling action in the direction opposite to the direction "F1" by the solid section 142 and the arrest against the bar 141. The following passage of cutaway section 143 below the arrested stacks (FIG. 6c) causes the stacks to fall on the conveyor belt 133 awaiting for the formation of the basic block 62.

In sequence the other sheet stacks 63 are deposited with further point-bonding on the preceding stacks. This occurs with alignment of an edge of the stacks on a geometrical plane "R2" defined by the bar 141. On completion of the basic block 62, the conveyor belt 133 is started on the control of the electronic unit 112 for the transfer of the block 62 on the input conveyor belt 151 of the separation group 123.

The cutting device 152 separates progressively the "slice blocks" 156 from the blocks basic 62. In sequence, the cutting device 154 separates the book blocks 22 from the "slice blocks" 156 and the extraction belt 153 moves along the direction "F3" the flanked book blocks 22 on the output conveyor belt 157. Here, the book blocks 22 are arranged one behind the other and are made to advance in the direction "F4" for the following processing by the system for manufacturing books 23.

Second Example

Figure 7:
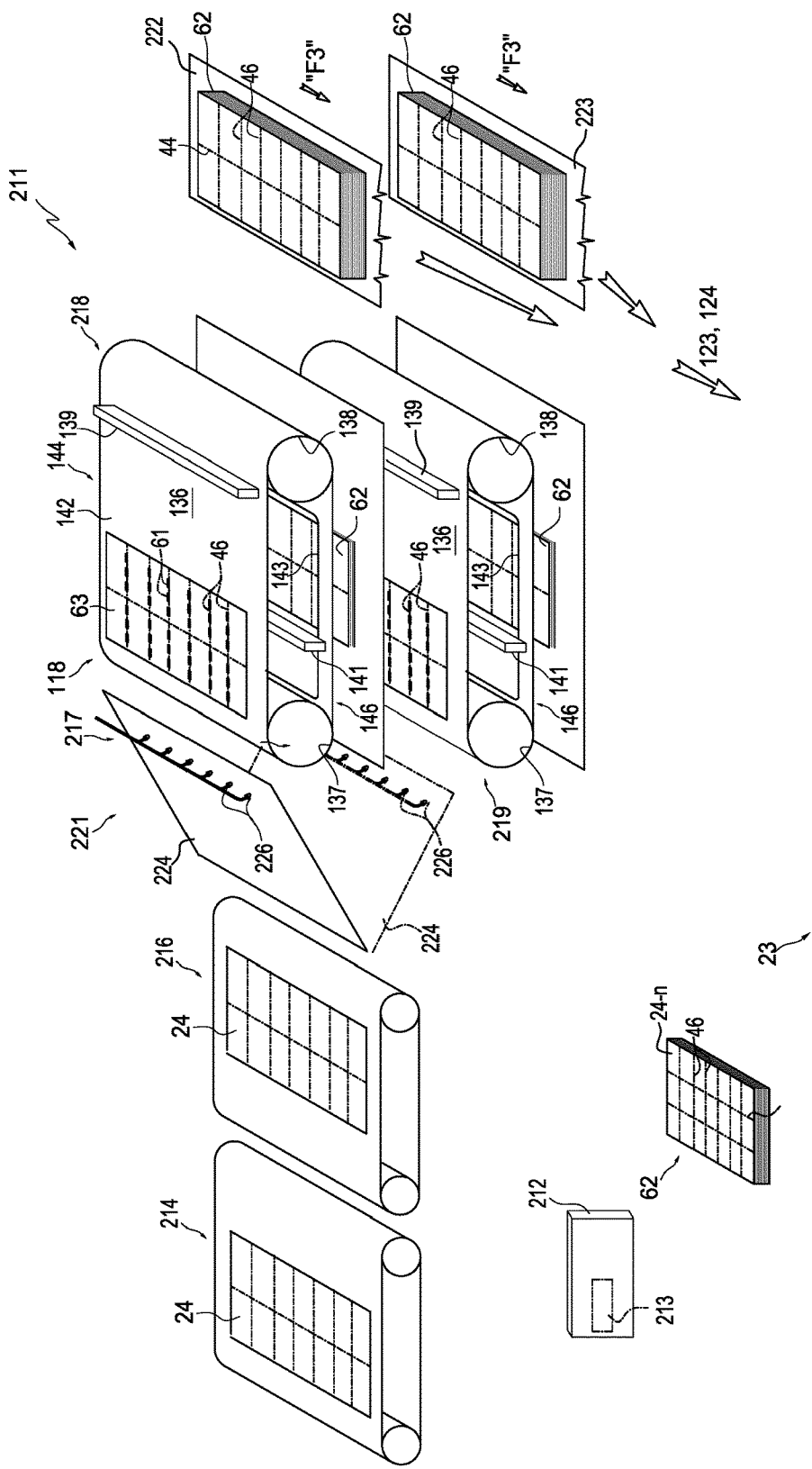
FIG. 7 is a schema of a production installation for block books in accordance with a second example of the embodiment of the invention.

In a second example of embodiment of the invention of FIG. 7, the production installation for book blocks in parallel, represented with 211, is controlled by an electronic unit 212 on the basis of a program 213. The production installation 211 operates on individual basic sheets 24 and presents an input conveyor belt 214 and an intermediate conveyor belt 216 for the basic sheets 24. The installation 211 is similar to the production installation 111 of FIG. 5 and can use the same separation group 123 for the book blocks 22-1, 22-2, . . . 22-*m* and the same serializing mechanism 124 for the separated book blocks 22.

The production installation 211 comprises, correspondingly to the point bonding group 121 and the stack overlapping device 126 of the installation 111, a point bonding group 217 and two sheet overlapping devices 218 and 219 with a diverter mechanism 221 for the basic sheets 24-1, 24-2, . . . 24-*n*. The installation 211 also uses, upstream of the separation group 123 two conveyor belts 222 and 223 and a conveying mechanism, not shown, of interface between the belts 222 and 223 and the separation group 123.

The diverter mechanism 221 presents a supporting plane 224 for the basic sheets 24 and can be actuated by the electronic unit 212 and by means of an actuator not shown, for directing the sheets 24 toward the overlapping device 218 or toward the overlapping device 219.

The point bonding group 217 comprises a plurality of nozzles 226 arranged above the support plane 224. The nozzles 226 are actuated jointly with the feeding of the basic sheets 24 along the plane 224 for an action of deposition of the adhesive strokes on the sheets 24. The overlapping devices 218 and 219 are similar each other and have the same functional components of the stack overlapping device 126 but operate on the individual pre-bonded basic sheets.

In particular the devices 218 and 219 operate on single sheets and each device comprises the ring band 136 for supporting and dragging the basic sheets 24 with the solid section 142 and the cutaway section 143, the stop bars 139 and 141 and the conveyor belt 133.

The production installation 211 consequently forms two basic blocks 62 directly with the pre-bonded sheets 24 and ensures a movement of the basic sheets 24 without stops with the formation of two book blocks 62 on the conveyor belts 222 and 223 and their transfer in sequence on the feed conveyor belt 151.

Third Example

Figure 8:
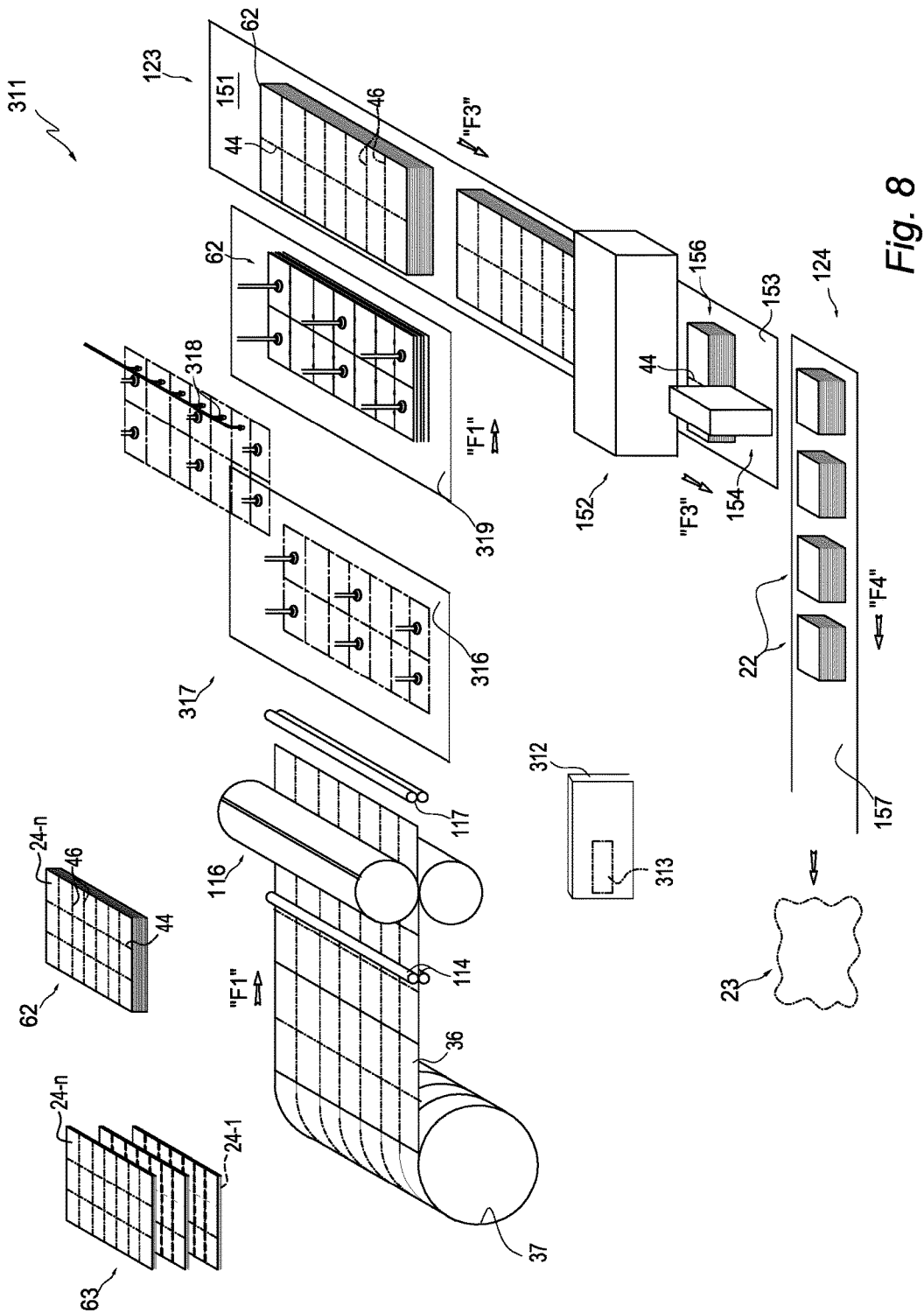
FIG. 8 is a schema of a production installation for block books in accordance with a third embodiment of the invention.

In a third embodiment of the invention of FIG. 8, the production installation for book blocks in parallel, represented with 311, is controlled by an electronic unit 312 on the basis of a program 313. The installation 311 is similar to the production installation 111 of FIG. 3 and operates with the pages of the book blocks 22 digitally printed on the two faces of the continuous strip 36 wound around the reel 37, and with forward movement in the direction "F1" by means of the feed rollers 114. The basic sheets 24 are transversely separated by the cutting device 116 and are extracted by the rollers 117 along the direction "F1" on a platform 316.

With respect to the installation 111, the production installation 311 has differences in the stacking group and in the point bonding group but uses the same separation group 123 for the book blocks 22-1, 22-2, . . . 22-*m* and the same serializing mechanism 124 for the separated book blocks 22.

In extreme synthesis, the stacking group comprises a suction cup transfer mechanism 317, while the point bonding group comprises a row of nozzles or similar dosing elements 318 for the adhesive strokes 61.

The transfer mechanism 317 has the function of raising the sheets from the platform 316, moving the sheets along the feed direction "F 1" and lowering the sheets on a conveyor belt 319 and in which the belt 319 is of support for a stack of basic sheets for the basic block 62 in formation.

The row of nozzles or dosing elements 318 is arranged transversely with respect to the feed direction "F1" and it distributes the adhesive strokes during the transfer of the basic sheets 24 from the platform 316 to the conveyor belt 319 with bonding to the basic block 62 in formation.

The electronic control unit 312 actuates the suction cup transfer mechanism 317 and the dosing elements 24 for moving incrementally the basic sheets to be point bonded and, respectively, for dispensing the adhesive strokes 61 on the areas of alignment of the book blocks 22.

At the completion of the block 62, the electronic unit 312 transfers the block 62 on the conveyor belt 151 of the separation group 123 for the following processing as for the installation 111 of FIG. 5.

Fourth Example

Figure 9:
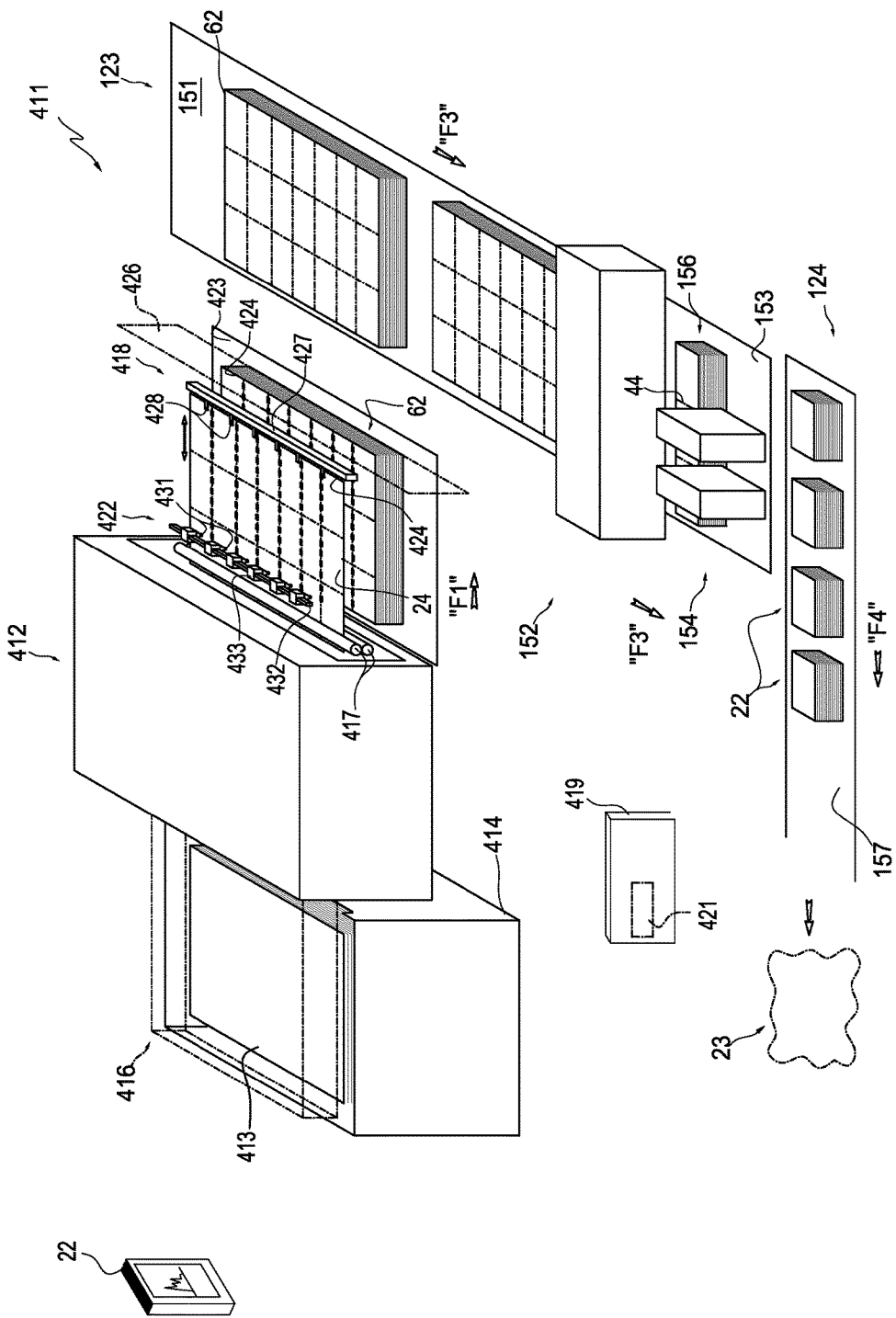
FIG. 9 is a schema of a production installation for block books in accordance with a fourth embodiment of the invention.

A production installation for book blocks in parallel in accordance with a fourth example embodiment of the invention is represented with 411 in FIG. 9. The installation 411 operates on line and in association with a digital printer 412 and in which the basic sheets 24-1, 24-2, . . . , 24-*n* for the pages of book blocks 22 are printed on single sheets. The printer 412 is supplied with sheets 413 that are taken from a stack of virgin of sheets of a magazine 414 by means of a sheet separating and feeding device 416. After printing, the printer 412 generates as output the basic sheets 24-1, 24-2, . . . , 24-*n* by means of motor rollers 417 and an extracting device 418.

The production installation 411 is controlled by an electronic unit 419 on the basis of a program 421. As regards the point-bonding of the basic sheets 24, the installation 411 uses a point bonding group 422, downstream and in proximity of the rollers 417, which distributes the adhesive strokes on the basic sheets 24-1, 24-2, . . . , 24-*n* jointly with their extraction.

For the stacking of the basic sheets 24, the installation 411 uses the rollers 417 and the extracting device 418 of the printer 412 (FIGS. 10*a* and 10*b*) and forms the basic blocks 62 by depositing the pre-bonded basic sheets 24, without sliding, on a conveyor belt 423 with a leading edge 424 aligned on a geometrical vertical plane 426. The other functional components of the installation 411 are similar to the ones of the installation 111 of FIG. 5, including the separation group 123 for separating the book blocks 22-1, 22-2, . . . 22-*m* from the basic blocks 62 and the serializing mechanism 124 for serializing the separated book blocks 22.

In the production installation 411, the extracting device 418 comprises a bar 427 parallel to the rollers 417 and a set of clamps 428 projecting from the bar 427 toward the rollers 417 for cooperating with the leading edge 424 of the sheets 24 emerging from the printer 412. The point bonding group 422 comprises a plurality of nozzles 431 (see FIG. 12) mounted on a rack 432 by means of carriages 433. The rack 432 is parallel to the rollers 417 and the carriages 433 can be positioned, for example manually along the rack, for positioning the nozzles 431 in front of the row lines 46.

Mechanisms, not shown, are provided for moving the bar 427 parallel to the conveyor belt 423 between a gripping configuration "I"(FIG. 10) in which the bar is adjacent to the rollers 417 and the leading edge 424 of the basic sheets 24 and a release configuration "II"(FIG. 10*b*) in which the bar is spaced away from the rollers 417 and a trailing edge 436 of the sheets 24 leaves the rollers 417. The clamps 428 are actuatable, in closure, for engaging the leading edge 424 of the sheets 24 in the configuration "I" and, in opening, for releasing the basic sheet 24 in the release configuration "II" with the leading edge 424 aligned with the geometrical plane 426.

In use, jointly to the print, the motor rollers 417 and the extracting device 418 move the basic sheet 24 parallel to the plane of the conveyor belt 423, while the nozzles 431 dispense the adhesive along the row lines 46 of sheets 24, jointly to the movement of the sheets, so as to cover all the areas provided for the adhesive strokes 61. At the end of the stroke of the bar 427, with the opening of the clamps 423, the sheet 24 overlaps, without sliding, on the basic block 62 in formation.

The overlapping occurs by gravity and is optimized by means of an air jet generator or a pressing mechanism, not shown, which can be actuated for operating on the sheets in release, whereby facilitating the point-bonding of the basic sheets on the basic block in formation.

According to a characteristic feature of the invention, the printer 412 is programmed for printing in the sheets 24, together with the basic texts and the images for books to be produced, the codes for the information of point-bonding and separation and traces identifying the row lines 46. In turn, the point-bonding 422 provides individual servo-mechanisms for the carriages 132 with optical sensors for detecting the traces and micro-motors servoized to the sensors for precision incremental movements of the carriages 132 between "+Δ" and "−Δ" (see FIG. 12). This allows to compensate for deviations of the row lines 46 lines with respect to theoretical positions, depending on, for example in the provision of ink jet printers, deformation of the paper due to the deposition process of the ink and a following drying at high temperatures.

The servoizing of the current positions of the nozzles to the real positions of the basic row lines 46 of the sheets 24 can advantageously be applied also to the installations of the examples of embodiment described above, by providing that the continuous strips or the sheets printed offline lines have the traces identifying the row lines 46 together with the data essential for the books and for separation.

Naturally, the principle of the invention remaining the same, the embodiments and the details of construction of the production installation for block books in parallel and the relative method can broadly be varied with respect to what has been described and illustrated, by way of non-limitative example, without by this departing from the ambit of the present invention.

If deemed it advantageous, the movement of the sheet stacks can be carried out by means of a conveyor with more belts instead by of the conveyor with a single belt or by means of moving shovels operating on fixed surfaces.

For stacking without sliding, devices different from those described can be provided. Such devices can include a fork shaped support for receiving the basic sheet during the dispensing of the adhesive with sliding on the bottom surface and which is retracted at the moment of the stacking.

The production installation for block books in accordance with the invention can also operate with system for manufacturing books which assemble multiple covers for more book blocks not separated into their upper/lower margins with respective book blocks, also not separated into their upper/lower margins. In this application, the "slice blocks" with more book blocks are assembled with the multiple covers and the separation of the books with the book blocks and the covers is carried out at a later time.

I claim:

1. A production installation for book blocks in parallel from digital prints on basic sheets, wherein each book block has a given number "n" of book sheets and each basic sheet has a number "m" of book sheets equal to the number "m" of the book blocks to be produced and wherein said installation comprises a stacking group for the basic sheets, a separation group for the book blocks, and an electronic control unit for the stacking group and the separation group,
   the book sheets are distributed on the basic sheets by aligning through aligning rows and aligning columns and separation areas adjacent to the book sheets; and
   the stacking group is actuatable for stacking the basic sheets and forming a basic block; wherein
   the book blocks and the basic sheets are in association with data derived from machine-readable basic codes, while said installation further comprises a bonding station including a point bonding group for the basic sheets and code detectors for the reading of the basic codes; and wherein:
   the point bonding group is provided for dispensing adhesive strokes on the basic sheets across the aligning rows and/or the aligning columns, in correspondence of the separation areas, while the stacking group stacks the basic sheets, without sliding, forming said basic block in which the book sheets are aligned and stabilized by the adhesive strokes;
   the separation group is provided for cutting the book blocks from the basic block along the aligning rows and the aligning columns of the book sheets and separating said book blocks for following treatments; and
   the electronic control unit responds to signals from said code detectors for actuating the point bonding group, the stacking group and the separation group on the basis of information from said basic codes.

2. Production installation for book blocks according to claim 1, wherein said point bonding group operates only on a face of the basic sheets to be stacked, which is provided for being superimposed by a following basic sheet.

3. Production installation for book blocks according to claim 1, wherein the stacking group operates, in a fractional way, by forming sheet stacks having a predetermined number of stacked basic sheets and superimposing the sheet stacks on a basic block in formation up to reaching the given number "n" of book sheets.

4. Production installation for book blocks according to claim 3 wherein said stacking group comprises a holding cylinder, for example of electrostatic type, for holding in alignment a given amount of entering basic sheets corresponding to a sheet stack, and wherein the point bonding group operates on basic sheets progressively held by the holding cylinder.

5. Production installation for book blocks according to claim 1, further comprising a sheet support for the basic sheets, wherein the stacking group comprises, in input, a suction cup transfer mechanism for moving the basic sheets along a given direction, wherein the point bonding group comprises a row of dispensing elements for the adhesive strokes, the electronic control unit actuates the suction cup transfer mechanism and the dispensing elements for moving the basic sheets to be pointed and, respectively, for dispensing the adhesive strokes on the separating areas of the book sheets, and wherein said suction cup transfer mechanism is provided for transferring the pre-bonded basic sheets from the sheet support to a stack of basic sheets for the basic block in formation.

6. Production installation according to claim 1, wherein said stacking group comprises an overlapping device including a closed ring band and a conveyor belt positioned below the closed ring band and of support and drag for the book block in formation, said ring band extends longitudinally in horizontal, defines an uncut section and a windowed section and has an upper branch and a lower branch and wherein said closed ring band is actuatable for receiving the basic sheets or the stacks of sheets to be superimposed on the uncut section of the upper branch with transferring to the lower branch through the windowed section, and for transferring the basic sheets or the sheet stacks from the lower branch, through the windowed section, on the book block in formation of the conveyor belt.

7. Production installation according to claim 1, wherein said installation is associated to a digital printer for printing said basic sheets, to a clamp extractor and to a supporting plane for the printed basic sheets, wherein said clamp extractor extracts printed basic sheets parallel to the support plane, the supporting plane receives sheets extracted by the clamp extractor as a book block in formation, and wherein said point bonding group operates on the printed basic sheets jointly with the extraction of the printed basic sheets for their stacking, without sliding, on the book block in formation.

8. Production installation according to claim 7 wherein said bonding station comprises a point bonding group with a plurality of nozzles for distributing the adhesive strokes on the basic sheets jointly to the movement of the printed basic sheets, wherein said stacking group comprises the clamp extractor for stacking, without sliding, the basic sheets by forming the basic block on the support plane, the book sheets of the respective book blocks are aligned and stabilized by the adhesive strokes and wherein the separation group is actuatable for receiving the basic blocks from the support plane.

9. Production installation for book blocks according to claim 1, wherein the separation group comprises a transport mechanism for moving the basic blocks along a given direction of work, a transversal cutting mechanism for cutting the basic blocks with separation of lines of the book blocks and definition of an edge of said book blocks and a longitudinal cutting mechanism for cutting the lines of the book blocks with separation of the book blocks and definition of another edge of the said book blocks.

10. Production installation for book blocks according to claim 1, wherein the basic codes are associated to point bonding information and separation information for the basic sheets and wherein the electronic control unit actuates the point bonding group, the stacking group and the separation group on the basis of said point bonding information and said separation information.

11. Production installation for book blocks according to claim 1, wherein the basic codes are of optical type (bar code, matrix code) printed on predefined positions of the basic sheets.

12. Production installation for book blocks according to claim 1 further comprising an electronic memory having locations addressable in response to data derived from the basic codes information for furnishing operative information to the electronic control unit functional to the actuation of the point bonding group, the stacking group and the separation group.

13. Production installation for book blocks according to claim 1 wherein the basic sheets provide optical readable tracks associated to the separation areas to be pre-bonded, and wherein the point bonding group comprises a plurality of nozzles mounted on carriages with possibility of transversal sliding with respect to the separation areas and further comprising individual servomotors for the carriages with optical sensors for the optical readable tracks and micromotors servoized to said sensors for fine positioning the nozzles with respect to said tracks.

14. Production installation for book blocks according to claim 1 further comprising an air jet generator or a pressing mechanism actuatable for operating on stacking basic sheets, whereby facilitating the point bonding of the stacking basic sheets on the basic block in formation.

15. A method for producing book blocks in parallel from digital prints on basic sheets, wherein each book block has a number "n" of book sheets to be assembled, said method being directed to produce in parallel a number "m" of book blocks and employs a number of basic sheets equal to the number of book sheets of each book block and wherein each basic sheet aligns a number "m" of book sheets equal to the number "m" of the book blocks, said method being controlled by an electronic control unit in response to data associated to the book blocks and the basic sheets derived from machine-readable basic codes and provides the following steps:
 a) dispensing adhesive strokes on the basic sheets at the separation areas of the book sheets on said book blocks whereby forming pre-bonded basic sheets;
 b) stacking the pre-bonded basic sheets as preparation for a basic block wherein the book sheets of the respective book blocks are aligned and pre-bonded in correspondence of an edge;
 c) separating the book blocks from the basic block by means of cuts along the aligning rows and the aligning columns of the book blocks; and
 d) arranging in sequence the separated book blocks for following treatments.

\* \* \* \* \*